(12) United States Patent
Favre et al.

(10) Patent No.: US 7,946,217 B2
(45) Date of Patent: May 24, 2011

(54) METHOD FOR PREPARING A BEVERAGE FROM A CAPSULE AND DEVICE THEREFOR

(75) Inventors: Eric Favre, Saint-Barthelemy (CH); Jacques Hentsch, Renens (CH)

(73) Assignee: Monodor S.A., Saint-Barthelemy (CH)

( * ) Notice: Subject to any disclaimer, the term of this patent is extended or adjusted under 35 U.S.C. 154(b) by 1320 days.

(21) Appl. No.: 10/565,482

(22) PCT Filed: Jun. 10, 2004

(86) PCT No.: PCT/IB2004/002016
§ 371 (c)(1),
(2), (4) Date: Jan. 20, 2006

(87) PCT Pub. No.: WO2005/006927
PCT Pub. Date: Jan. 27, 2005

(65) Prior Publication Data
US 2006/0174769 A1 Aug. 10, 2006

(30) Foreign Application Priority Data

Jul. 23, 2003 (EP) .................................... 03016753

(51) Int. Cl.
*A47J 31/06* (2006.01)
(52) U.S. Cl. ........ 99/295; 99/302 P; 99/302 R; 426/433
(58) Field of Classification Search .................... 99/295, 99/302 R, 302 P; 426/433
See application file for complete search history.

(56) References Cited

U.S. PATENT DOCUMENTS

| | | | | |
|---|---|---|---|---|
| 2,778,739 A | * | 1/1957 | Rodth | 426/77 |
| 3,607,297 A | * | 9/1971 | Fasano | 426/433 |
| 5,388,502 A | * | 2/1995 | Hufnagl | 99/295 |
| 5,398,595 A | * | 3/1995 | Fond et al. | 99/295 |
| 5,472,719 A | * | 12/1995 | Favre | 426/77 |
| 5,598,764 A | * | 2/1997 | Bambi | 99/295 |
| 5,762,987 A | * | 6/1998 | Fond et al. | 426/433 |
| 5,794,519 A | | 8/1998 | Fischer | |
| 6,182,554 B1 | * | 2/2001 | Beaulieu et al. | 99/289 R |
| 6,752,070 B1 | * | 6/2004 | Lin | 99/295 |
| 7,024,985 B2 | * | 4/2006 | Park | 99/302 P |
| 2002/0023543 A1 | | 2/2002 | Schmed | |
| 2004/0112223 A1 | * | 6/2004 | De'Longhi | 99/279 |
| 2005/0034604 A1 | * | 2/2005 | Halliday et al. | 99/279 |

FOREIGN PATENT DOCUMENTS

| | | |
|---|---|---|
| EP | 0 521 187 A1 | 7/1991 |
| EP | 0 521 188 A1 | 7/1991 |
| EP | 0 870 457 A1 | 7/1993 |
| WO | WO 00/56629 | 9/2000 |
| WO | WO 95/25457 | 9/2005 |

* cited by examiner

*Primary Examiner* — Reginald L Alexander
(74) *Attorney, Agent, or Firm* — Baker & Daniels LLP

(57) ABSTRACT

A method for preparing a beverage or a liquid foodstuff from a capsule containing a product with a substance to be extracted, the capsule having a flexible membrane (17) capable of deforming elastically or permanently to a considerable extent, comprising the steps of perforating a plurality of holes (26) distributed over the flexible membrane and of injecting water onto the flexible membrane, in such a manner that it deforms in the direction of the product inside the capsule and in that the water penetrates into the capsule via said holes. The size of the holes perforated by the perforating spikes is controlled by the level to which the capsule is filled or by the compactness of the product inside the capsule, so as to influence the hydraulic pressure differential $\Delta P$ between the two sides (17$a$, 17$b$) of the flexible membrane, in such a manner as to achieve an automatic adjustment of the compression of the product contained in the capsule.

15 Claims, 6 Drawing Sheets

METHOD FOR PREPARING A BEVERAGE FROM A CAPSULE AND DEVICE THEREFOR

The present invention relates to a method for preparing a beverage or a liquid foodstuff from a capsule, a capsule containing a substance to be extracted, and a device for carrying out the method It is already known how to prepare a beverage from a capsule containing a product to be extracted, for example coffee, such as is described in the international patent application WO 92 07775. The capsule is received inside a capsule carrier or housing of the device, which can be pressed sealingly against an injection head designed as to inject hot water into the capsule. The bottom of the capsule carrier or of the housing is provided with means for perforating the bottom of the capsule, in order to allow coffee or some other extracted beverage to flow out from the capsule.

In the known devices, different systems are available for injecting water into the capsule. Some systems include a grid provided with multiple orifices for distributing the injected water over an upper porous membrane of the capsule, such as those described in the European Application EP 0 006 175. The injection heads can also be provided with multiple spikes, such as those described in the U.S. Pat. No. 3,607,297, for perforating a membrane closing sealingly the capsule. In some systems, the injection head includes one or several injection spikes, which are each provided with a water injection channel and which perforates the upper membrane of the capsule, in order to inject water directly inside the capsule, via the injection channels provided in the injection spikes. The injection heads provided with perforating means offer the advantage that they make it possible to provide the capsules with an upper sealing membrane, which does not need to be removed before use.

The injection systems with a single spike and in which the water injection orifice is arranged inside the capsule, have the drawback of not distributing the injected water in a uniform manner through the product contained in the capsule and this is conducive to the formation of preferential flow channels through the substance to be extracted. The result is an extraction of the product to be extracted, which is not complete and a strong decrease of the extraction pressure inside the capsule during the process, owing to the low resistance offered by the preferential flow channels.

In systems with an injection head with multiple perforating spikes, such as those described in U.S. Pat. No. 3,327,614, EP 604 615 or EP 1 203 554, the problem of preferential channels forming is decreased by comparison with the use of a single injection spike, without however being eliminated.

In all the known systems, during the extraction, the resistance to the flow of the water injected through the product contained in the capsule tends to decrease, in particular in the last phase of the extraction.

In view of the drawbacks cited above, one objective of the invention is to provide a method for preparing a beverage or a liquid foodstuff, from a capsule containing a product with a substance to be extracted, which is efficient and which makes it possible to optimise the extraction of said substance.

Another objective of the invention is to provide a device and a capsule containing a product with a substance to be extracted, for the preparation of a beverage or of a liquid foodstuff, which make it possible to optimise the extraction of said substance.

It is advantageous to provide a method for preparing a beverage or a liquid foodstuff and a device with a capsule for carrying out the method, which are capable of improving the taste and the texture of the beverage or of the liquid foodstuff obtained.

It is advantageous to provide a method and a device with a capsule for carrying out the method, in particular for the preparation of hot coffee or chocolate, which make it possible to generate a thick froth.

The objectives of the invention are achieved by a method for preparing a beverage or a liquid foodstuff according to that claimed, through the use of a device for preparing a beverage or a liquid foodstuff according to that claimed, and by a capsule containing a product with a substance to be extracted for the preparation of a beverage or a liquid foodstuff according to that claimed.

Advantageously, the method, the device and the capsule according to the invention make it possible to ensure a good distribution of the injected water in the capsule and to retain a counter pressure within the capsule, in order to optimise the extraction of the product to be extracted, inside the capsule.

Furthermore, the method, the device and the capsule according to the invention make it possible to avoid the formation of preferential flow channels. In the case of products leaving behind spent material in the capsule, such as ground coffee, the pressure exerted by the upper membrane of the capsule against the product to be extracted, makes it possible, on the one hand, to avoid the formation of preferential flow channels and, on the other hand, to retain a counter pressure to the injection pressure, so as to ensure that the extraction proceeds during the entire extraction cycle at a high pressure, which optimises the extraction, and makes it possible to achieve a richer flavour and a more thorough extraction of the whole of the product contained in the capsule. Moreover, the high pressure applied during the entire extraction cycle makes it possible to obtain a very good froth.

The recovery of the froth can be further improved by providing, on the bottom of the capsule carrier, a collector portion with a wall defining an upwards protruding orifice provided with partial outflow slots for evacuating the liquid extract, with one portion of the froth flowing through the upwards protruding orifice of the collector portion.

In the case of products which do not leave behind any spent material, i. e. which are extracted completely, such as powdered chocolate or powdered milk, the method, the device and the capsule, according to the invention, enable an extraction which is complete while allowing for the formation of a good froth.

Other advantageous objects and features will become apparent from the claims, from the description and from the appended drawings, in which:

FIG. 1 is a cross-sectional view of a part of a device for preparing a beverage or a liquid foodstuff, showing a portion of an injection head and of a capsule carrier in which is nested a capsule filled with a product with a substance to be extracted, the injection head and the capsule carrier being in an initial position, awaiting extraction FIG. 2 is a view similar to FIG. 1, however with the injection head in its "ready for injection" position, i. e. pressed sealingly against the upper face of the capsule in the capsule carrier;

Figure 1:
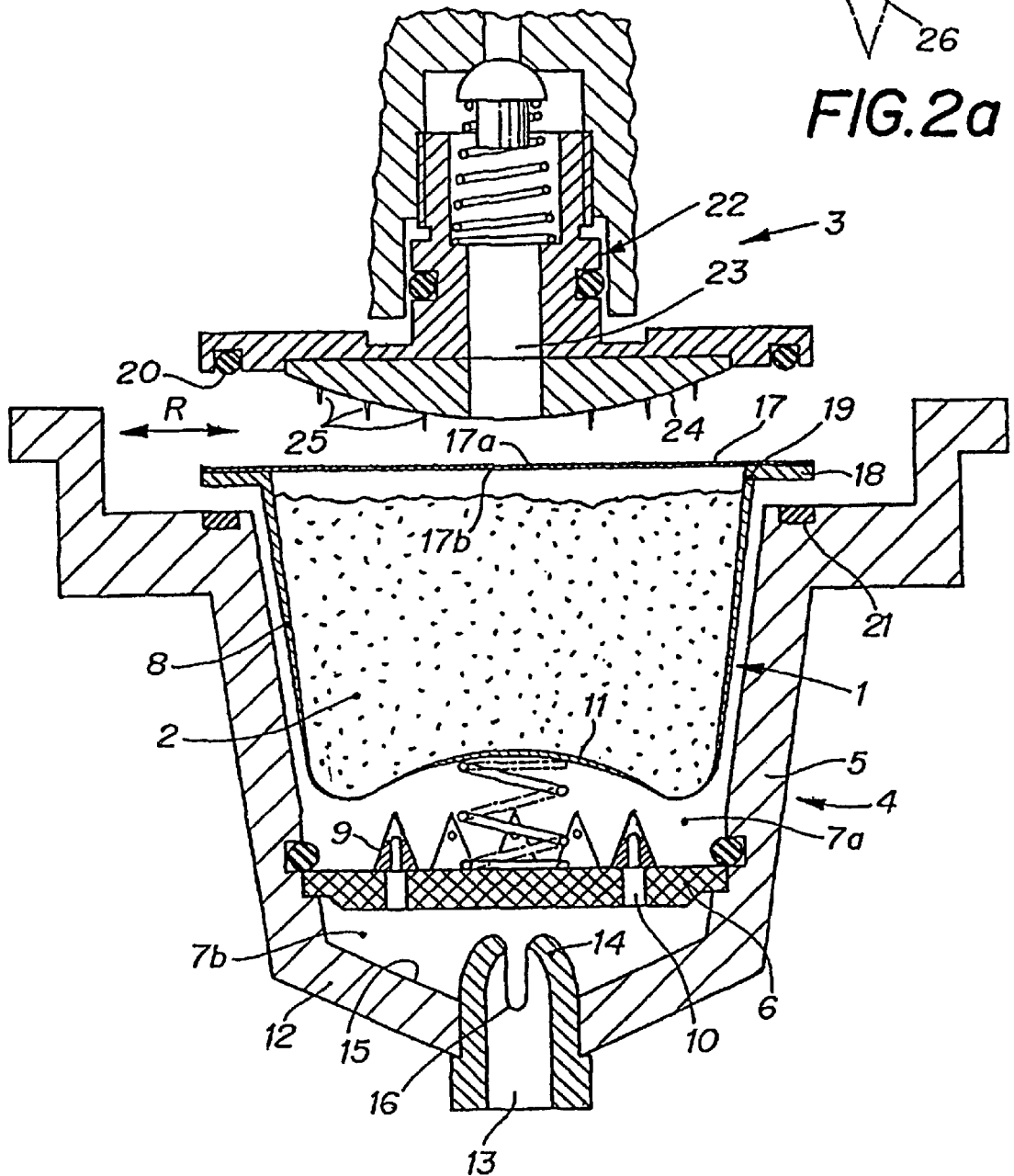
Figure 2A:
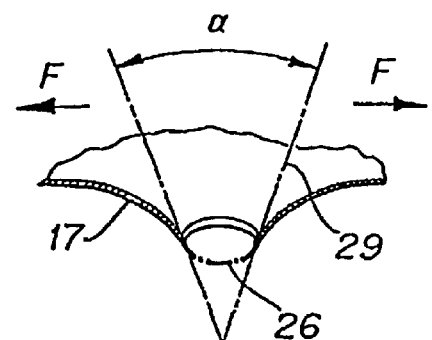
FIG. 2a is a detailed partial view illustrating the penetration, by a perforating spike of the injection head, into a flexible membrane of the capsule.
Figure 2:
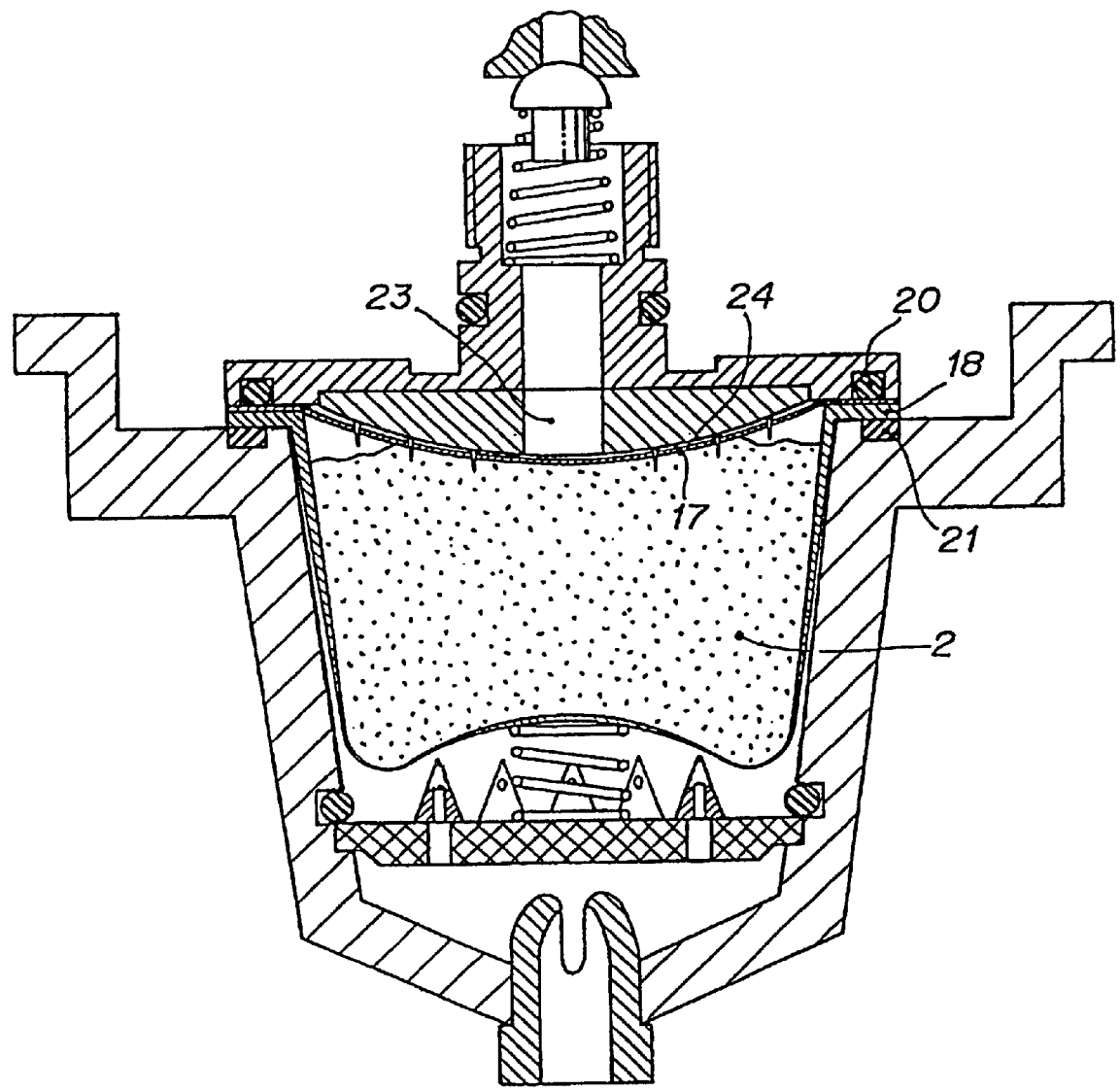
Figure 3:
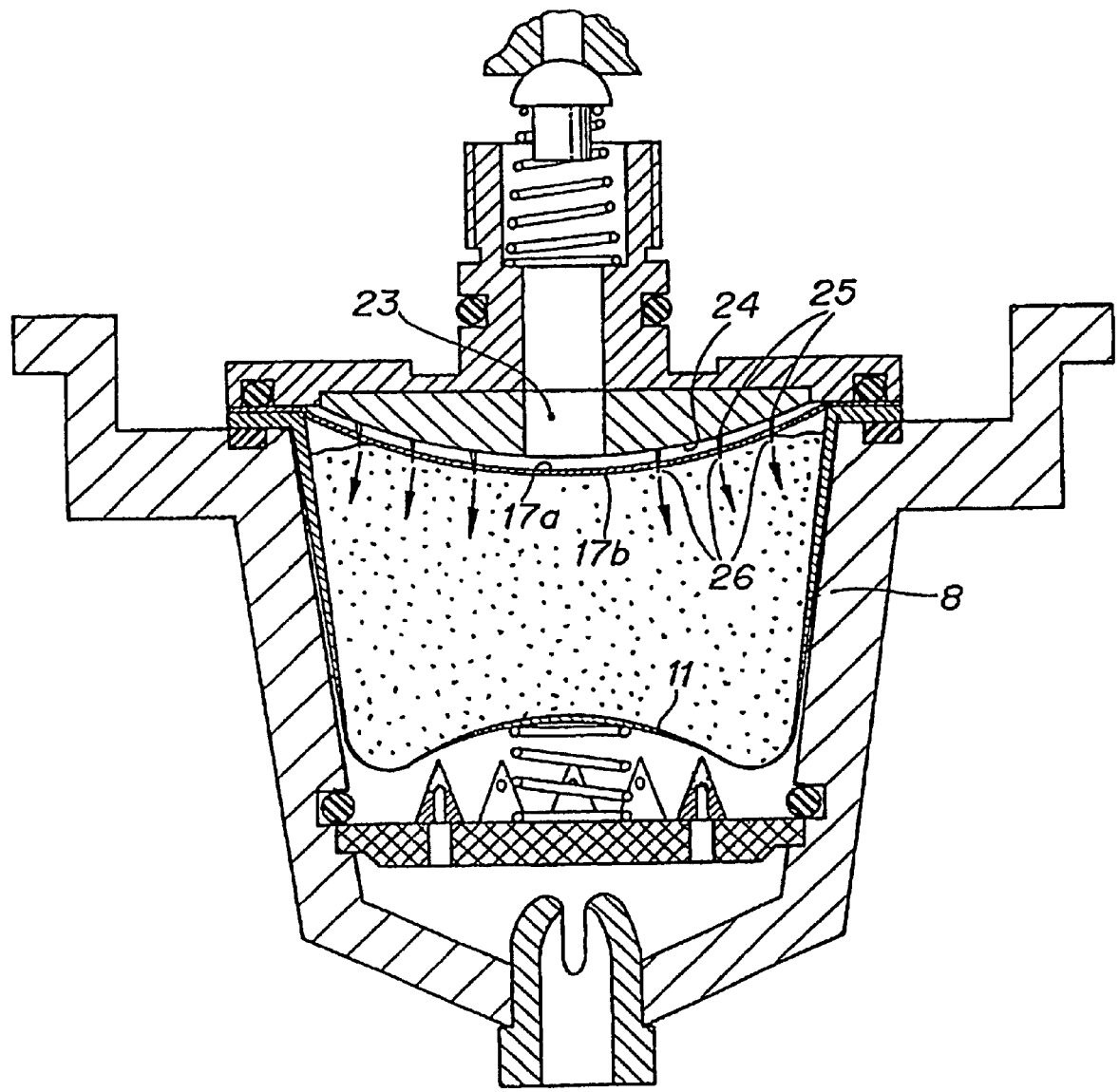
FIG. 3 is a view similar to FIG. 2, in an early initial phase of the water injection.
Figure 4:
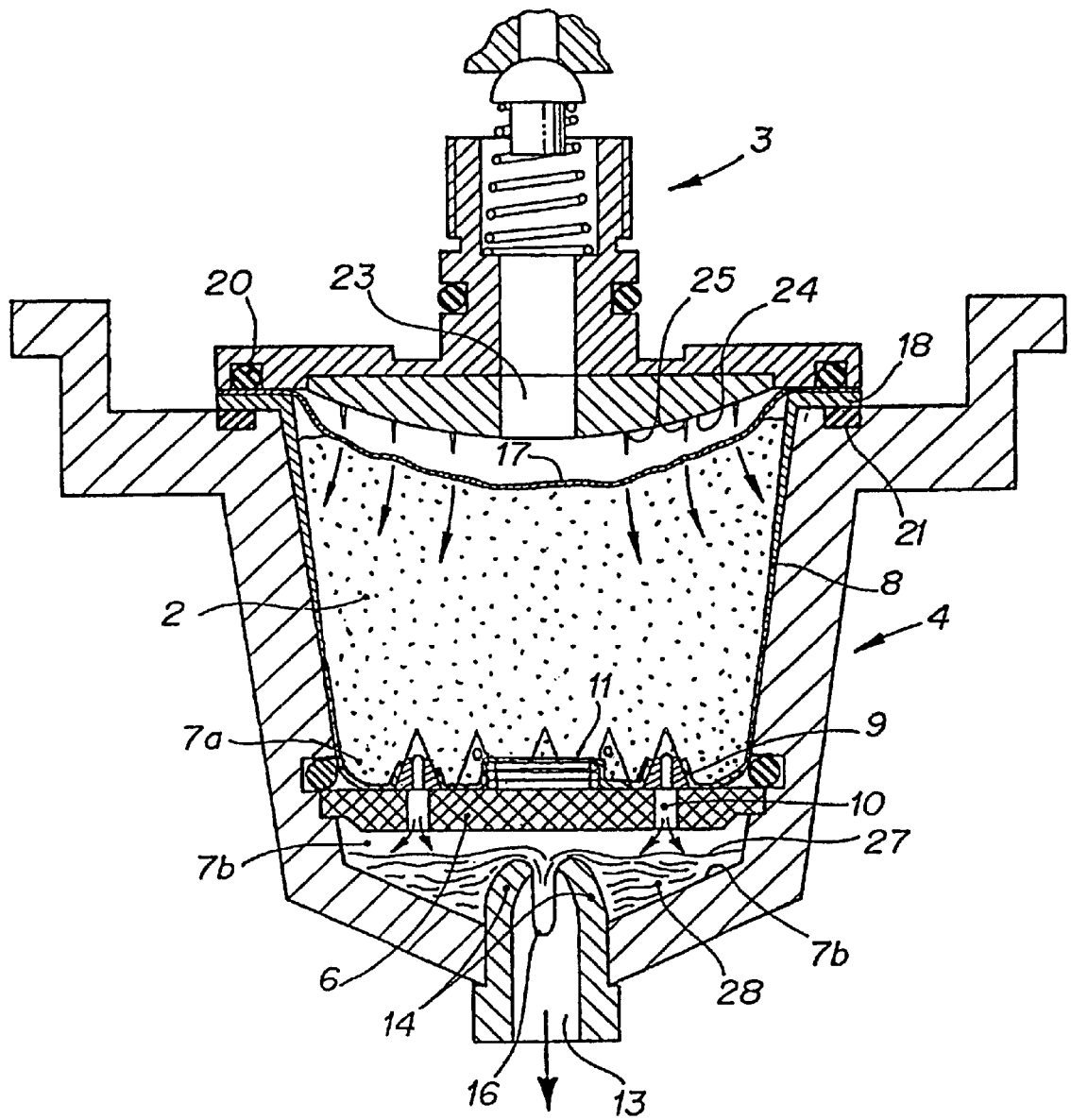
FIG. 4 is a view similar to FIG. 3, in a more advanced phase of the water injection.
Figure 5:
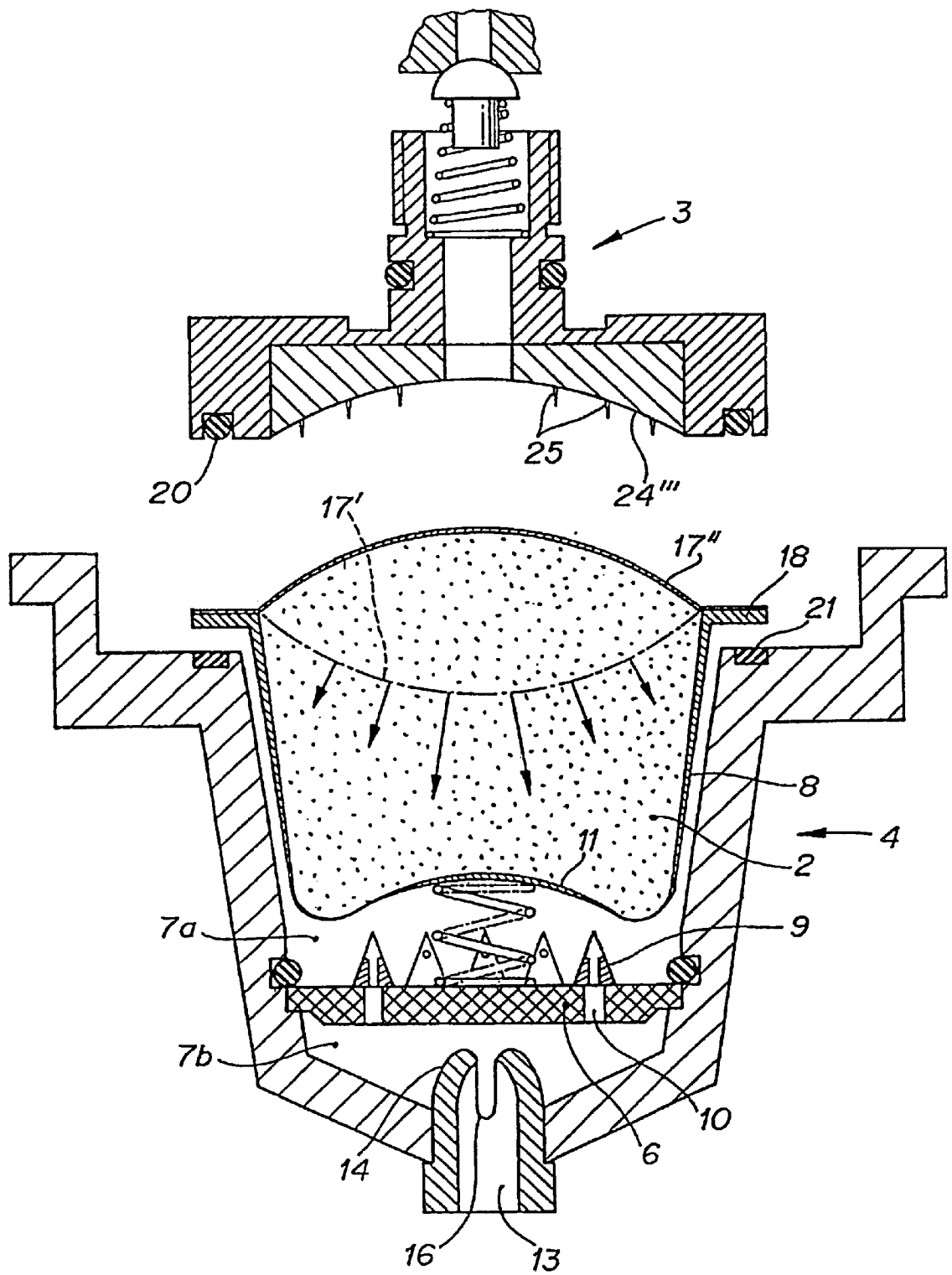
FIG. 5 is a cross-sectional view of an alternate version of the injection head and of the capsule.

Referring to the figures, a device for preparing a beverage or a liquid foodstuff from a capsule 1 containing a product 2 with a substance to be extracted, comprises an injection head 3 and a capsule carrier 4 which can be tightly pressed against the injection head, as illustrated in FIGS. 2 to 4, by a bayonet system or some other system. The capsule carrier 4 has a side wall 5 and an intermediate bottom wall 6, forming together an upper cavity portion 7a, into which is nested the capsule 1. The side wall 5 has a slightly conical shape which matches the also substantially conically shape of a side wall 8 of the capsule. Advantageously, the intermediate bottom wall 6 can also be provided in the form of a filtering wall carrying a plurality of perforating spikes 9 and having outflow orifices 10 extending through said wall, wherein the spikes are designed for perforating the bottom wall 11 of the capsule.

Advantageously, the bottom wall 11 of the capsule can have a concave shape (when viewed from outside), which bulges outwards when a certain pressure is reached in the capsule during the injection, in such a manner as to make it possible for the perforating spikes 9 to perforate the bottom wall 11 and for the extracted beverage to flow out via the outflow orifices 10 of the filtering wall 6. The liquid flows into a lower cavity portion 7b of the capsule carrier located between the intermediate bottom wall 6 and a bottom wall 12.

The bottom wall 12 of the capsule carrier 4 has an outflow channel 13 which is surrounded by a lip 14 protruding upwards with respect to the lowest point 15 of the bottom wall 12, wherein the lip 14 includes one or several slots 16 extending to the lowest point 15 of the lower cavity portion 7b, in order to allow a full evacuation of the liquid from the capsule carrier. The upwards protruding lip 14 makes it possible for a portion of the froth 27 floating on the surface of the liquid 28 in the lower cavity portion to enter the evacuation channel 13 and be emptied at the same time as the liquid without froth, via the upwards protruding orifice. This system makes it possible to retain a larger amount of the froth than a conventional system in which the evacuation channel has a plain orifice at the position of the lowest point.

The capsule 1 includes a flexible membrane 17 welded or bonded to an annular flange section 18 extending radially from one end 19 of the side wall 8 of the capsule 1. Both the flange section 18 and the welded portion of the flexible membrane 17 are held between an annular seal 20 provided on the injection head and the upper flange section 21 of the capsule carrier 4. The side wall 8 and the bottom wall 11 of the capsule are preferable provided as a single piece made by the injection moulding of a polymer, such as polypropylene or any other plastic material capable of being recycled. The side wall 8 and the bottom wall 11 form a thin shell, which is relatively rigid by comparison with the flexible membrane 17. The flexible membrane 17 is preferably also made from one or more polymers selected for their capacity to undergo significant elastic deformations and/or permanent deformations. Preferably, the flexible membrane is made of a material related or identical to that of the shell 8, 11, which advantageously facilitates the recycling of the capsule.

Advantageously, the flexible membrane 17 can be formed from a multiple layer sheet, such as a multiple layer polypropylene sheet, in order to improve its tensile strength and its deformability (elastic and/or permanent). This is important, in view of the fact that the membrane, subjected to the high pressure of the water injected during the extraction, deforms considerably. The multiple layer membrane can advantageously be formed with more than five layers. It was found that seven layers make it possible to achieve the elasticity characteristics and the tensile strength characteristics, which are optimal for specific applications.

During the extraction, the annular flange section 18 functions as a support capable of withstanding the tensile force exerted by the membrane, non only because the flange section is highly rigid in the radial direction R, but also because the flange section is pressed and retained between the capsule carrier and the annular seal 20 of the injection head.

The injection head 3 comprises a body 22 having a water supply channel 23 opening on a perforating surface 24 provided with a plurality of perforating spikes 25, which are spaced apart from one another and distributed over the perforating surface 24. In this embodiment, the water supply channel opens substantially at the centre of the perforating surface 24, but it is also possible to provide several supply channels opening at different locations on the perforating surface. The diameter of the perforating surface 24 is approximately equal to or smaller than the diameter of the flexible membrane 17 of the capsule.

The perforating spikes 25 have, preferably, a conical shape, i. e. they have a cross-section, which is substantially circular. The perforating spikes could also have an elliptic cross-section or any other smooth shape (i. e. without any sharp edges), which is tapered and which ends with a perforating spike. The generator 29 of the shape of the perforating spikes is preferably a straight line, but it could also be a curved line.

Advantageously, the surface without sharp edges of the perforating spikes makes it possible to obtain a hole 26 formed through the elastic membrane 17 having an edge 26 (see FIG. 2a) which is smooth, even and devoid of sharply angled portions, in order to avoid a rupture of the membrane when a tensile force is applied to the same.

The angle of the cone of the perforating spikes is, preferably, between 30 and 50°. The angle of the cone and the depth of penetration of the spike into the membrane 17 determine the diameter of the perforated hole 26. The depth of penetration of the perforating spikes through the membrane 17 will depend, in particular, on the resistance offered by the product 2 from within the capsule, when the injection head is in its "ready for injection" lowered position, as illustrated in FIG. 2.

Accordingly, the elastic and permanent deformation properties of the membrane 17, in combination with the shape of the perforating spikes (having a smooth surface and a cone with a certain angle), make it possible to form holes 26 which have a shape making the membrane resistant to tear and of which the bigger or smaller size is dependant upon the amount of the product filling the capsule and upon the compactness thereof. Accordingly, the less the capsule is filled with a product 2, the smaller will the holes perforating the membrane be. In a situation where the product offers no counter resistance during the perforation, the diameter of the holes 26 will depend upon the shape of the perforating surface 24, the elastic and the plastic properties of the flexible membrane 17 and upon the shape of the perforating spikes.

When water is injected under pressure via the supply channel 23, the flexible membrane deforms under the pressure, as is illustrated in FIG. 3, and moves away from the perforating surface 24 of the injection head. The water under pressure flows through the flexible membrane via the plurality of perforations 26 distributed over the surface of the membrane and wets the product, which is inside the capsule. The increase in the pressure in the capsule causes the wall of the bottom 11 to bulge outwards and said wall is, accordingly, projected rapidly against the perforating spikes of the filtering wall 6 and perforated, thus enabling the liquid 28 to flow into the lower cavity portion 7b, as illustrated in FIG. 4.

The pressure exerted by the flexible membrane on the product inside the capsule during the extraction makes it possible for the product to remain relatively compact and prevents the formation of preferential flow channels. On the other hand, the pressure exerted by the membrane makes it also possible to ensure that the counter resistance to the flow of liquid through the product remains high during the entire extraction cycle, thus improving the wetting of the product, its extraction and the generation of froth.

The extent of the deformation of the flexible membrane 17 is determined by the hydraulic pressure differential $\Delta P$ between the surface 7a thereof onto which the water is injected and the surface 7b thereof facing the inside of the capsule. The pressure differential $\Delta P$ is dependent upon the size and the number of the holes 26. The size of these holes 26 is function, amongst others, of the resistance offered by the membrane 17 to its perforation by the spikes 25. This resistance will depend, in particular, on the amount of product 2 contained in the capsule 8. This situation ensures an automatic adjustment of the compression of the product 2 contained in the capsule 8. The less product there is in the capsule, the greater will the deformation of the membrane be and the lower will the flow of water be, which also restricts the formation of preferential channels.

Figure 6:
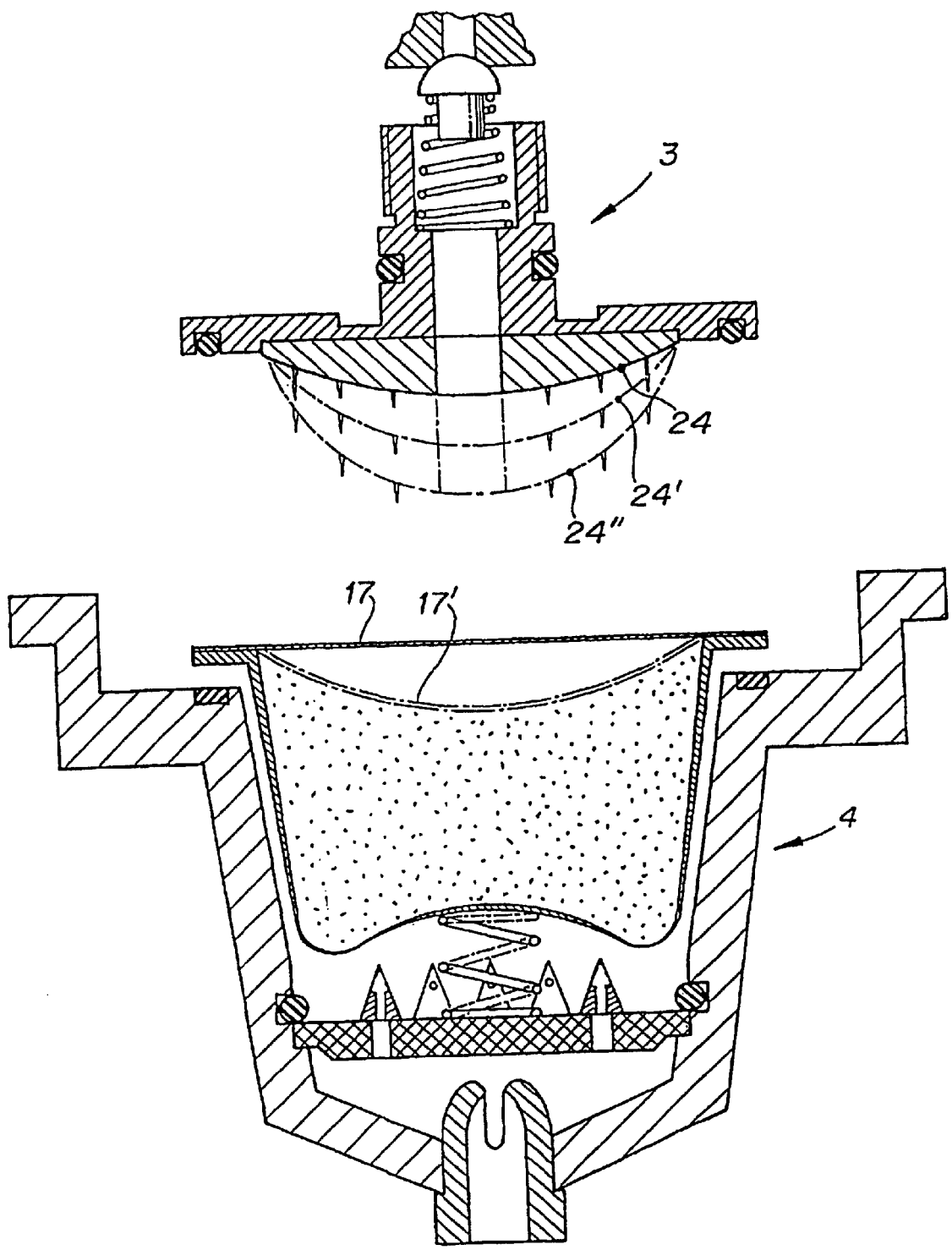
FIG. 6 is a cross-sectional view of another alternate version of the injection head and of the capsule according to the invention.

The preferred shape of the perforating surface 24 is a convex one, as illustrated in FIG. 6, to engage with a flexible membrane 17 of the capsule, which is substantially planar. The curvature of the perforating surface 24, 24', 24" can be more or less pronounced and, in the case of the perforating surface 24" having a strong curvature, the flexible membrane could even be concave (when viewed from outside), such as indicated by the reference number 17'. The injection heads with perforating surfaces 24" with a strong curvature can be very useful, when the capsule 1 is filled with a small amount of product, as the case may arise with tea.

The perforating surface can also have a shape which is concave (when viewed from outside) 24''', in the case where the capsules are filled entirely and the flexible membrane 17" has a convex shape (when viewed from outside). In this case, the flexible membrane 17" itself can even be semi-rigid and shaped by thermoforming, owing to the fact that it is not subjected to a tensile deformation in an initial phase of extraction or exhibit no rigidity at all, if the compressed spent material remaining in the capsule has a volume greater than the volume defined by the shell of the capsule and the membrane in the "concave" position (symmetrical with respect to the "convex" position).

The invention claimed is:

1. A device for preparing a beverage or a liquid foodstuff from a capsule containing a product with a substance to be extracted, wherein the device includes an injection head comprising a perforating surface having a shape which is substantially curved and convex, when viewed from outside, provided with a plurality of perforating spikes distributed over the perforating surface and at least one water supply channel arranged to supply water onto the perforating surface, the perforating spikes having a smooth tapered shape without sharp edges and an average cone angle less than 60°, including a body or a capsule carrier comprising a bottom wall, an intermediate bottom wall in the form of a filtering wall having a plurality of perforating spikes and outflow orifices, and a lower cavity portion arranged between the filtering wall and the bottom wall, wherein the bottom wall comprises an outflow channel surrounded by lips which protrude upwards with respect to the lowest point of the lower cavity portion.

2. A device according to claim 1, wherein the perforating spikes have substantially the shape of cones with substantially straight line generators.

3. A device for preparing a beverage or a liquid foodstuff from a capsule containing a product with a substance to be extracted, wherein the device includes an injection head comprising a perforating surface having a shape which is substantially curved and convex, when viewed from outside, provided with a plurality of perforating spikes distributed over the perforating surface and at least one water supply channel arranged to supply water onto the perforating surface, the perforating spikes having a smooth tapered shape without sharp edges and an average cone angle less than 60°, wherein the capsule comprises a shell which is substantially rigid and which comprises a side wall and a bottom wall to form the container in which the product is contained, the shell further comprising an annular flange section extending substantially in a radial plane R, whereby the flexible membrane is bonded or welded to the annular flange section, the flexible membrane and the shell being made from one or several polymers and the flexible membrane being made from a multiple layer sheet.

4. A device according to claim 3, wherein the shell and the membrane comprise polypropylene.

5. A device according to claim 3, wherein the flexible membrane is made from a sheet comprised of at least five layers.

6. A device according to claim 3, wherein the flexible membrane has a shape, which is substantially planar, before the use of the capsule.

7. A device according to claim 3, wherein the side wall of the shell of the capsule is substantially conical, whereby the diameter of the cone decreases from the annular flange section in the direction of the bottom wall.

8. A device according to claim 3, wherein the perforating spikes have an average cone angle between 30° and 50°.

9. A method for preparing a beverage or a liquid foodstuff from a capsule containing a product with a substance to be extracted, the capsule comprising a substantially stiff container and a flexible membrane closing an open side of the container, the membrane being capable of significant elastic or permanent deformation, the method including the steps of
providing an injection head including a perforating surface having a shape which is convex when viewed from the outside, and provided with a plurality of perforating spikes distributed over the perforating surface, having a tapered and smooth shape without any sharp edges, and at least one water supply channel for supplying water onto the perforating surface,
perforating a plurality of smooth holes distributed over the flexible membrane by means of said injection head, said perforating surface thereby urging the flexible membrane against the product inside the capsule or applying a tensile force to the membrane and
injecting water onto the flexible membrane in such a manner that the membrane deforms in the direction of the product contained inside the capsule and in that the water penetrates into the capsule via the smooth holes without the smooth holes tearing.

10. A method according to claim 9, wherein the size of the holes perforated by the perforating spikes is controlled, inter alia, by the level to which the capsule is filled or by the compactness of the product inside the capsule, so as to influence the hydraulic pressure differential $\Delta P$ between the two sides of the flexible membrane in such a manner as to obtain an automatic adjustment of the compression of the product contained in the capsule.

11. A method according to claim 9, comprising the step of providing a capsule comprising a shell which is substantially rigid and which comprises a side wall and a bottom wall to form the container in which the product is contained, the shell further comprising an annular flange section extending substantially in a radial plane R, whereby the flexible membrane is bonded or welded to the annular flange section, and the said flange section and a welded portion of the flexible membrane being held between an annular seal on the injection head and an upper flange section of the capsule carrier.

12. A method according to claim 11, further comprising providing a capsule shell and membrane comprising polypropylene.

13. A method according to claim 11, further comprising providing a flexible membrane made from a sheet comprised of at least five layers.

14. A method according to claim 11, further comprising providing a flexible membrane having a shape, which is substantially planar, before the use of the capsule.

15. A method according to claim 11, further comprising providing a side wall of the shell of the capsule having a substantially conical shape, whereby the diameter of the cone decreases from the annular flange section in the direction of the bottom wall.

* * * * *